United States Patent
Ohta et al.

(10) Patent No.: US 10,306,725 B2
(45) Date of Patent: May 28, 2019

(54) LIGHT SOURCE DRIVE DEVICE AND VEHICLE LAMP

(71) Applicant: Koito Manufacturing Co., Ltd., Tokyo (JP)

(72) Inventors: Shinji Ohta, Shizuoka (JP); Katsuya Fukuta, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/894,144

(22) Filed: Feb. 12, 2018

(65) Prior Publication Data

US 2018/0242421 A1    Aug. 23, 2018

(51) Int. Cl.
  *H05B 33/08*    (2006.01)
  *H05B 41/282*    (2006.01)

(52) U.S. Cl.
  CPC ..... *H05B 33/0854* (2013.01); *H05B 33/0815* (2013.01); *H05B 33/0824* (2013.01); *H05B 33/0848* (2013.01); *H05B 33/0887* (2013.01); *B60Q 2300/146* (2013.01); *H05B 41/2828* (2013.01)

(58) Field of Classification Search
  None
  See application file for complete search history.

(56) References Cited

U.S. PATENT DOCUMENTS

| 6,335,577 | B1 * | 1/2002 | Baba | H02H 3/087 307/28 |
| 9,485,813 | B1 * | 11/2016 | Lewis | H05B 33/0809 |
| 9,711,092 | B2 * | 7/2017 | Kishi | G09G 3/3225 |
| 9,980,334 | B2 * | 5/2018 | Radermacher | H05B 33/0854 |
| 2004/0178737 | A1 * | 9/2004 | Takeda | B60Q 1/00 315/77 |
| 2006/0038511 | A1 * | 2/2006 | Tagawa | G09G 3/3413 315/291 |
| 2007/0103098 | A1 * | 5/2007 | Shiotsu | H05B 33/0815 315/312 |
| 2009/0045359 | A1 * | 2/2009 | Kumahara | G01S 7/493 250/559.38 |
| 2009/0167187 | A1 * | 7/2009 | Kitagawa | H05B 33/0854 315/77 |

(Continued)

FOREIGN PATENT DOCUMENTS

| JP | 2016-192512 A | 11/2016 |
| JP | 2016-201341 A | 12/2016 |

*Primary Examiner* — Crystal L Hammond
(74) *Attorney, Agent, or Firm* — Abelman, Frayne & Schwab

(57) ABSTRACT

Provided is a light source drive device including: a current supply device; and a light source device including a light emitting element that emits light by receiving drive current supplied from the current supply device, a temperature sensor that performs temperature detection at a position closer to the light emitting element than the current supply device, and a signal generation unit that outputs a control signal for controlling the drive current depending on a detected value of the temperature sensor to the current supply device. The signal generation unit generates a control signal for reducing the drive current depending on a temperature when the temperature detected by the temperature sensor is equal to or higher than a predetermined temperature.

13 Claims, 8 Drawing Sheets

(56) References Cited

U.S. PATENT DOCUMENTS

| | | | |
|---|---|---|---|
| 2013/0162157 A1* | 6/2013 | Suzuki | H02M 7/217 |
| | | | 315/201 |
| 2015/0123549 A1* | 5/2015 | Radermacher | H05B 33/0848 |
| | | | 315/185 R |
| 2015/0158414 A1* | 6/2015 | Ohta | B60Q 1/00 |
| | | | 315/77 |
| 2016/0249428 A1* | 8/2016 | Bandel | H05B 33/0854 |
| 2018/0116026 A1* | 4/2018 | McDougal | H05B 33/0848 |
| 2018/0218244 A1* | 8/2018 | Yano | B41J 2/451 |

* cited by examiner

LIGHT SOURCE DRIVE DEVICE AND VEHICLE LAMP

CROSS-REFERENCE TO RELATED APPLICATIONS

This application is based on and claims priority from Japanese Patent Application No. 2017-030923, filed on Feb. 22, 2017 with the Japan Patent Office, the disclosure of which is incorporated herein in its entirety by reference.

TECHNICAL FIELD

The present disclosure relates to a light source drive device and a vehicle lamp including the light source drive device.

BACKGROUND

For example, a light source such as, for example, a light emitting diode (LED) or a laser diode may be used in various lamps such as, for example, a vehicle lamp. These lamps may perform so-called temperature derating for controlling a drive current applied to the light source depending on a temperature, in order to protect the light source from heat under a high temperature.

For example, when the temperature of the LED is equal to or higher than a predetermined value, the value of a drive current to be supplied to the LED is lowered depending on the temperature.

Japanese Patent Laid-open Publication Nos. 2016-201341 and 2016-192512 disclose a vehicle lamp which performs temperature derating.

SUMMARY

In the case of performing temperature derating, the specification of the start temperature or the inclination of a current control (the inclination of a control characteristic for reducing a current depending on a temperature) is set as a circuit design. However, the requirement specification of temperature derating is changed depending on a lamp. This is because temperate derating depends on, for example, the number of lamps of a light source device, a steady-state current value, a heat dissipation structure, and an assumed ambient temperature environment.

A lamp is usually configured with a light source device which is mounted with a light emitting element such as, for example, an LED, and a current supply device which supplies a drive current to the light emitting element of the light source device. In addition, the light source device and the current supply device may be formed separately. For example, the respective devices are configured on different substrates and connected to each other by a harness.

In addition, in the case where the lamp is made to have a temperature derating function, an information generation circuit is provided on the current supply device side so as to generate control information for temperature derating based on temperature detection information of the LED.

Separately configuring the current supply device and the light source device is useful to standardize the current supply device or to reduce the manufacturing cost thereof since, for example, a common current supply device may be used in various light source devices.

However, the standardization of the current supply device may be hindered since temperature derating requirement specifications are different depending on a light source device as described above. That is, light source devices, which may use a current supply device of one product number, are limited due to temperature derating. Therefore, there is a situation in which the current supply device needs to be designed and manufactured depending on the light source device.

On the other hand, although it is conceivable to use a common current supply device without changing the temperature derating specification. However, in such a case, a countermeasure at the light source device side is required. For example, the heat dissipation structure of the LED may be enlarged. This causes an increase in the cost of the light source device side.

In view of these problems, the present disclosure provides a lamp having a temperature derating function depending on various light source specifications at a lower cost using a common current supply device.

A light source drive device according to the present disclosure includes a current supply device, and a light source device comprising a light emitting element that emits light by receiving drive current supplied from the current supply device, a temperature sensor that performs temperature detection at a position closer to the light emitting element than the current supply device, and a signal generation unit that outputs a control signal for controlling the drive current depending on a detected value of the temperature sensor to the current supply device. The signal generation unit generates a control signal for reducing the drive current depending on a temperature when the temperature detected by the temperature sensor is equal to or higher than a predetermined temperature.

That is, the temperature sensor and the signal generation unit are disposed on a substrate of the light source device in which the light emitting element such as, for example, an LED is disposed. In addition, the drive current from the current supply device is lowered from a basic current value at a high temperature.

In the light source drive device, it is conceivable that the signal generation unit includes a control signal line that outputs the control signal to the current supply device, and is connected to an adjustment element that adjusts a value of the control signal.

For example, a coding resistor is connected as the adjustment element.

In the light source drive device, it is conceivable that the current supply device includes a control resistor having one end connected to a reference voltage and is configured to output the control signal to a remaining end of the control resistor, and that the signal generation unit sinks control current to the remaining end of the control resistor via the control signal line when the temperature is equal to or higher than the predetermined temperature, and increases an amount of the control current as the temperature increases.

That is, the control signal is obtained based on the reference voltage at the remaining end side of the control resistor. In addition, the control signal is changed as the amount of current increases at the remaining end side.

The light source drive device according to the present disclosure includes a temperature acquisition unit including a light emitting element and a temperature sensor that detects a temperature near the light emitting element, the temperature acquisition unit performing a first processing of acquiring detection information of the temperature sensor when lighting of the light emitting element starts and a second processing of acquiring detection information of the temperature sensor at a time point at which a predetermined time has passed from the start of lighting, and a determination unit that performs determination of abnormality of the temperature sensor by determining a change in the detection information acquired in the first processing and the detection information acquired in the second processing.

Thereby, temperature detection abnormality for temperature derating, specifically, abnormality of the temperature sensor is detected. When abnormality is determined, a countermeasure processing such as, for example, instructing a reduction in drive current may be performed.

A vehicle lamp according to the present disclosure includes the light source drive device described above. In addition, the current supply device includes a voltage conversion unit that performs voltage conversion by receiving a DC voltage, and supplies a drive current to cause the light emitting element to emit light.

That is, as the vehicle lamp, a temperature sensor and a signal generation unit are disposed on a substrate of a light source device in which a light emitting element such as, for example, an LED is disposed.

According to the present disclosure, it is possible to provide a lamp, which performs temperature derating suitable for a light emitting element even though a common current supply device is used, which may promote the standardization of the current supply device or a reduction in manufacturing costs.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

<First Embodiment>

Hereinafter, a light source device and a vehicle lamp according to a first exemplary embodiment of the present disclosure will be described.

Figure 1:
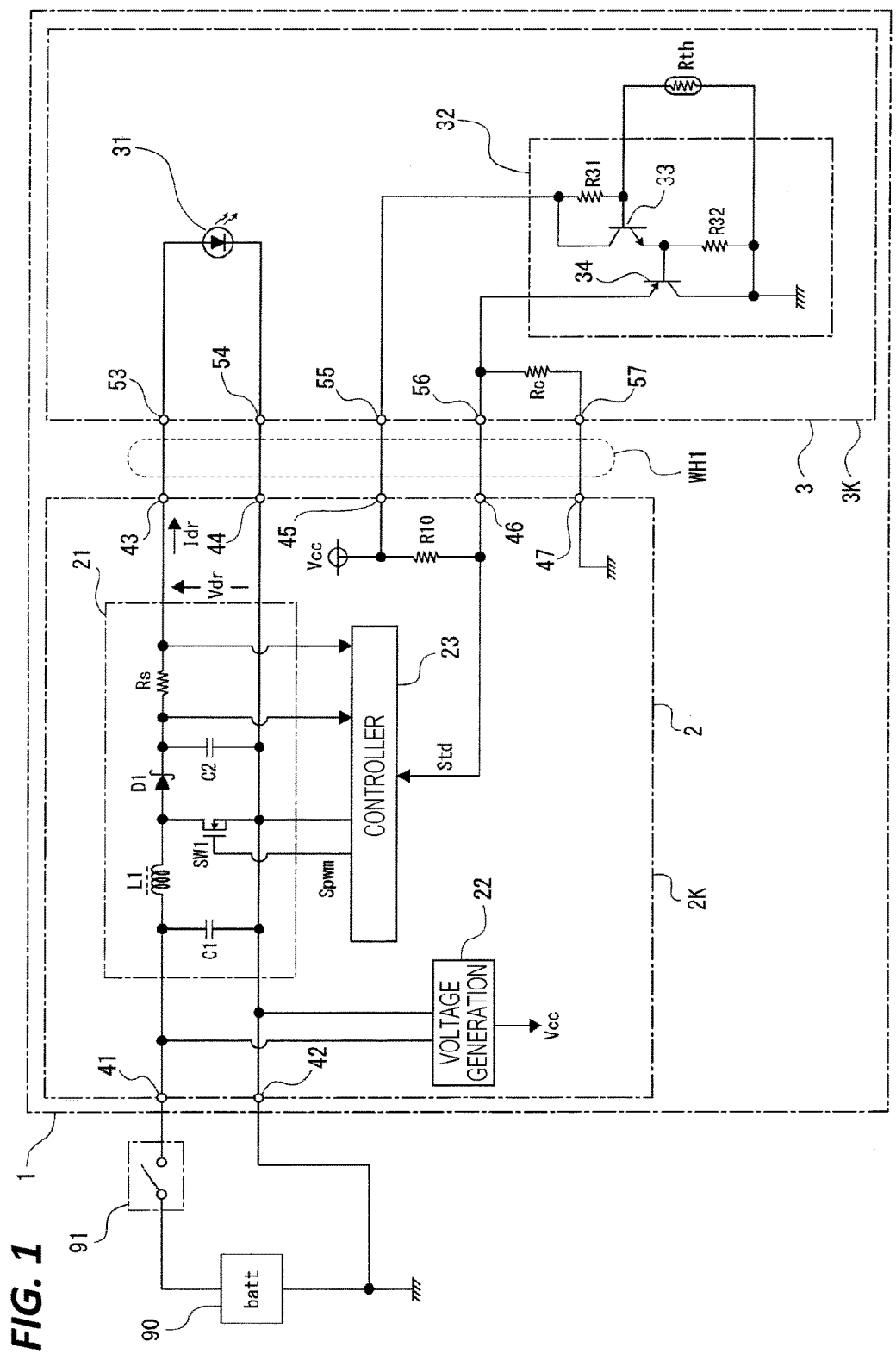
FIG. 1 is a circuit diagram of a vehicle lamp according to a first exemplary embodiment of the present disclosure.

FIG. 1 is a circuit diagram illustrating a case where a light source drive device, which includes a current supply device 2 and a light source device 3, is used as a vehicle lamp 1.

The vehicle lamp 1 may be suitably applied, for example, to various lamps such as, for example, a vehicle headlamp, a turn signal lamp, and a backlight.

The current supply device 2 is configured with various electronic parts disposed on, for example, a current supply substrate 2K.

In addition, the light source device 3 is formed to have one or a plurality of light emitting elements disposed on a light source substrate 3K, which is a substrate different from the current supply substrate 2K. In this example, an LED 31 is used as a light emitting element. However, the light emitting element is not limited to the LED 31, and is assumed to be, for example, a laser diode. In addition, it is conceivable that a plurality of light emitting elements is connected in series or in parallel.

The current supply device 2 is configured to receive power supplied from a battery 90 of a vehicle between terminals 41 and 42 provided on the current supply substrate 2K.

A switch 91 is interposed between a positive electrode terminal of the battery 90 and the terminal 41 of the current supply device 2, and the lighting on/off of the vehicle lamp 1 is controlled by the ON/OFF of the switch 91. The terminal 42 on the current supply substrate 2K is connected to a negative electrode side of the battery 90 via a ground point.

In addition, although not illustrated, the current supply device 2 may be configured to be communicably connected to an electronic control unit (ECU), which performs electrical control on the vehicle side. In that case, a configuration in which a power voltage line and a ground line from the battery 90 are connected to the terminals 41 and 42 via the ECU so as to allow the ECU to control power supply to the current supply device 2 is conceivable.

In the light source device 3 of the vehicle lamp 1, the LED 31 is connected between terminals 53 and 54 provided on the light source substrate 3K. Then, the LED 31 is driven to emit light when drive current Idr, which is subjected to constant current control, is supplied thereto from the current supply device 2.

In addition, a thermistor (temperature detection resistor) Rth as a temperature sensor is disposed, for example, near the LED 31 in the light source device 3 on the light source substrate 3K.

In addition, the light source device 3 is equipped with a signal generation unit 32, which generates a derating control signal Std and a coding resistor Rc.

As terminals relating to these circuits, terminals 55, 56, and 57 are provided on the light source substrate 3K.

The current supply device 2 includes a DC/DC converter 21, a voltage generation unit 22, and a controller 23.

Here, the controller 23 is illustrated as a circuit system, which performs constant current control of the output current on the DC/DC converter 21 and performs current limitation for a temperature derating function in response to the derating control signal Std.

The voltage generation unit 22 generates a reference voltage Vcc, which is used in the circuit system such as, for example, the controller 23, from an input voltage, and supplies the reference voltage Vcc to each unit.

The DC/DC converter 21 is a voltage conversion unit that supplies the drive current Idr to the LED 31 of the light source device 3.

The DC/DC converter 21 performs voltage conversion by receiving a DC voltage from the battery 90, and generates an output voltage Vdr between terminals 43 and 44 provided on the current supply substrate 2K.

A first harness WH1 connects the terminals 43 and 53 to each other and the terminals 44 and 54 to each other. Thus, the drive current Idr based on the output voltage Vdr, which appears on the output side of the DC/DC converter 21, flows in the order of the terminal 43→the terminal 53→the LED 31→the terminal 54→the terminal 44.

The DC/DC converter 21 is, for example, a switching regulator. It is conceivable that the DC/DC converter is of a step-up type, a step-down type, or a step-up/step-down type, although it depends on a relationship between a light source configuration (e.g., forward effect voltage) of the light source device 3 and a power voltage by the battery 90.

FIG. 1 illustrates an exemplary DC/DC converter as a step-up-type switching regulator by way of example.

The DC/DC converter 21 includes an inductor L1, a switch SW1, a rectifier diode D1 with a Schottky diode, condensers C1 and C2, and a current detection resistor Rs.

As illustrated in FIG. 1, the condenser C1 is connected as an input side filter between the terminals 41 and 42. One end of the inductor L1 is connected to the terminal 41 on the positive electrode input side and the other end of the inductor L1 is connected to an anode of the rectifier diode DE A serially connected circuit of the inductor L1 and the rectifier diode D1 is connected to the battery 90 in series. The switch SW1 is inserted between the connection point of the inductor L1 and the rectifier diode D1 and a ground line, and thus is connected in parallel to the battery 90. For example, the switch SW1 is configured as a switching element such as, for example, a metal-oxide-semiconductor field-effect transistor (MOSFET).

In addition, a smoothing condenser C2 on the output side is connected between a cathode of the rectifier diode D1 and the ground line, and is connected in parallel to the switch SW1.

One end of the current detection resistor Rs is connected to the connection point of the cathode of the rectifier diode D1 and the condenser C2, and the other end thereof is connected to the terminal 43.

The DC/DC converter 21 is configured, for example, as the step-up-type switching regulator described above, and generates the output voltage Vdr between the terminals 43 and 44 based on the switching control of the switch SW1.

The controller 23 executes a voltage conversion operation of the DC/DC converter 21 and performs constant current control of the drive current Idr.

For example, the controller 23 detects a current value of the drive current Idr based on the result of detecting the potential difference between one end and the other end of the current detection resistor Rs via two input terminals. Then, the controller 23 compares the detected current value of the drive current Idr with a target current value, and generates a PWM control signal Spwm depending on the difference. The controller 23 controls a voltage conversion operation by supplying the PWM control signal Spwm to the switch SW1 of the DC/DC converter 21, thereby implementing constant current output.

In addition, the derating control signal Std is supplied to the controller 23 by the signal generation unit 32. The controller 23 implements temperature derating by increasing or decreasing the target current value based on the derating control signal Std.

The signal generation unit 32 provided on the light source substrate 3K side generates the derating control signal Std depending on a detected value of the temperature of the LED 31 detected by the thermistor Rth.

Terminals 45, 46, and 47 are provided on the current supply substrate 2K side so as to correspond to the signal generation unit 32. These terminals 45, 46, and 47 and the terminals 55, 56 and 57 on the light source substrate 3K side are connected to each other by the first harness WH1.

The line of the terminals 45 and 55 is used as a supply line of the reference voltage Vcc from the current supply substrate 2K side to the signal generation unit 32.

The line of the terminals 46 and 56 is used as a control signal line, which supplies the derating control signal Std generated by the signal generation unit 32 to the current supply device 2.

The line of the terminals 47 and 57 is used as the ground line.

In addition, although the first harness WH 1 connects the terminals 43, 44, 45, 46, and 47 and the terminals 53, 54, 55, 56, and 57 to each other by way of example, various other connection forms are conceivable. For example, a harness connecting the terminals 43 and 44 and the terminals 53 and 54 to each other and another harness connecting the terminals 45, 46, and 47 and the terminals 55, 56, and 57 to each other may be used.

The signal generation unit 32 is configured with resistors R31 and R32, a transistor 33, which is an NPN-type bipolar transistor, and a transistor 34, which is a PNP-type bipolar transistor.

The reference voltage Vcc is applied to the collector of the transistor 33, and base current is supplied to the base of the transistor 33 based on a voltage divided by the resistor R31 and the thermistor Rth. The emitter of the transistor 33 is grounded through the resistor R32. In addition, the thermistor Rth is inserted between the base of the transistor 33 and the ground.

The collector of the transistor 34 is grounded, and the base of the transistor 34 is connected to the emitter of the transistor 33. The emitter is connected to the terminal 56.

The thermistor Rth is a negative temperature coefficient (NTC) thermistor, and the resistance value thereof decreases as the temperature rises. Thus, the base voltage of the transistor 33 decreases as the temperature rises.

In the signal generation unit 32, the value of current flowing through the emitter-collector of the transistor 34 is controlled depending on the current flowing through the collector-emitter of the transistor 33. Here, the control resistor R10 provided on the current supply substrate 2K side and the coding resistor Rc on the light source substrate 3K side are connected to each other in series between the reference voltage Vcc line and the ground line. In addition, the coding resistor Rc and the transistor 34 are connected in parallel to each other.

The derating control signal Std is a voltage value obtained by voltage-dividing the line of the reference voltage Vcc by the control resistor R10 and the coding resistor Rc during the period for which the transistor 34 is turned off. On the other hand, when the transistor 34 is conductive, a voltage value as the derating control signal Std decreases depending on the value of current flowing through the transistor 33.

Here, the derating control characteristic will be described with reference to FIGS. 2A and 2B.

Figure 2A:
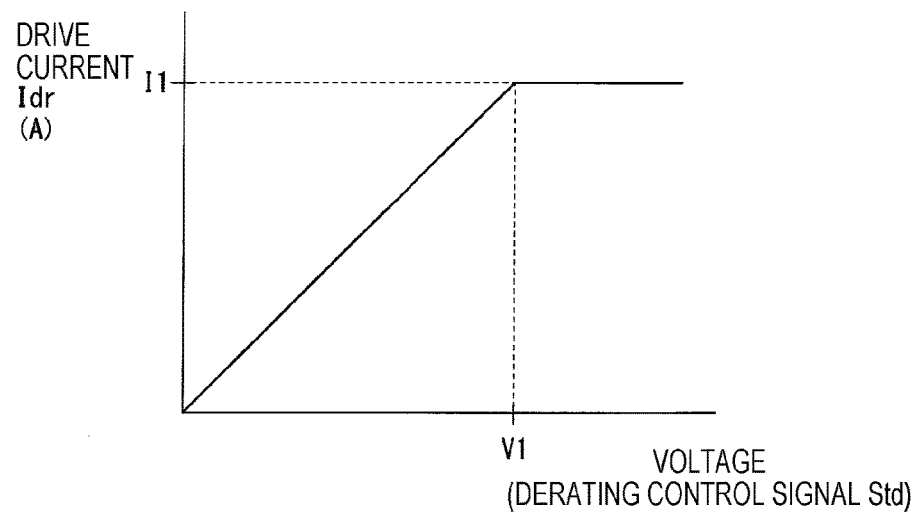
FIGS. 2A and 2B are explanatory diagrams of a temperature derating characteristic of the exemplary embodiment.

First, the controller 23 controls the drive current Idr based on a voltage value as the derating control signal Std, as illustrated in FIG. 2A.

In FIG. 2A, the horizontal axis represents the voltage value as the derating control signal Std, and the vertical axis represents the current value of the drive current Idr.

When the derating control signal Std is equal to or higher than a voltage V1, it is assumed that the temperature is a normal temperature, and the driving of the DC/DC converter 21 is controlled to set the drive current as basic setting (Idr=I1). On the other hand, when the derating control signal Std is lower than the voltage V1, it is assumed that the temperature is high, and the driving of the DC/DC converter 21 is controlled to decrease the drive current Idr depending on the voltage value of the derating control signal Std. That is, the target value of constant current control is lowered.

Figure 2B:
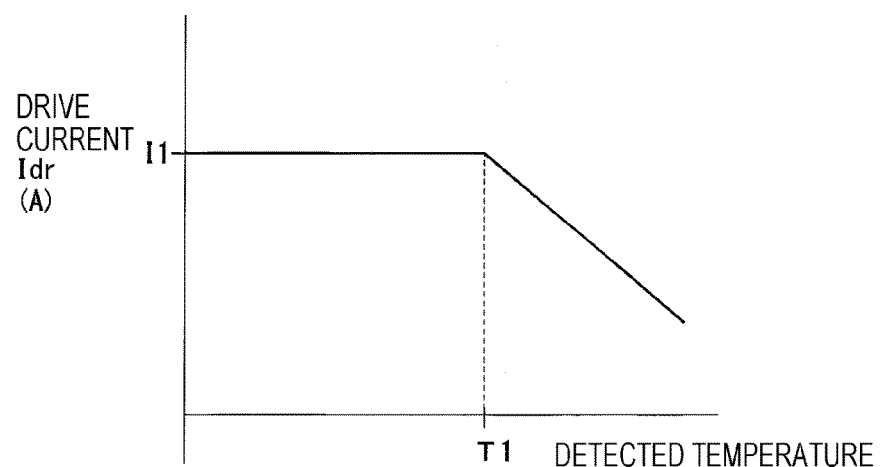

Derating control as illustrated in FIG. 2B is executed using an operation of the controller 23 as described above.

In FIG. 2B, the horizontal axis represents the detected temperature of the LED 31, and the vertical axis represents the current value of the drive current Idr.

That is, in the normal temperature state, constant current control is performed so as to set the current value to a predetermined current value I1. When the detected temperature exceeds a predetermined start temperature T1, a temperature derating function is activated so as to reduce the drive current Idr depending on the detected temperature.

Thus, when the detected temperature is equal to or higher than the start temperature T1, the signal generation unit 32 may function to lower the voltage value as the derating control signal Std depending on the temperature.

Therefore, when the temperature detected by the thermistor Rth is less than the start temperature T1, the transistor 34 is turned off, and the derating control signal Std becomes a voltage value (e.g., a voltage value V1) obtained by the voltage dividing of the line of the reference voltage Vcc by the control resistor R10 and the coding resistor Rc. On the other hand, when the detected temperature is a high temperature, the transistor 34 becomes conductive so as to lower the voltage value as the derating control signal Std depending on the value of current flowing through the transistor 34. Therefore, derating control as illustrated in FIG. 2B is executed.

A specific example of an operation of the signal generation unit 32 will be described. For example, the following values are assumed.

Control resistor R10 . . . 39 kΩ
Coding resistor Rc . . . 15 kΩ
Resistor R31 . . . 24 kΩ
Reference voltage Vcc . . . 7 V
Derating start temperature T1 . . . 100° C.
Representative values when the detected temperature is 25° C. are as follows.
Resistance value of thermistor Rth . . . 100 kΩ
Current flowing in the thermistor Rth . . . 49 µA
Current flowing in the line of the terminals 45 and 55 . . . 4.1 mA
Voltage value of control signal Std . . . 94 V
Current flowing in the collector-emitter of the transistor 33 . . . 4 mA
Current flowing in the emitter-collector of the transistor 34 . . . 0 (OFF)
Current flowing in the line of the terminals 46 and 56 . . . 129 µA (=1.94 V/15 kΩ)
Representative values when the detected temperature is 120° C. are as follows.
Resistance value of thermistor Rth . . . 2.9 kΩ
Current flowing to the thermistor Rth . . . 260 µA
Current flowing to the line of the terminals 45 and 55 . . . 313 µA
Voltage value of control signal Std . . . 0.77 V
Current flowing to the collector-emitter of the transistor 33 . . . 53 µA
Current flowing to the emitter-collector of the transistor 34 . . . 108 µA
Current flowing to the line of the terminals 46 and 56 . . . 159 µA As described above, the current flowing in the emitter-collector of the transistor 34 is consequently controlled based on the resistance value of the thermistor Rth depending on the temperature, whereby the voltage value of the control signal Std is changed. By this operation, temperature derating control is implemented.

In addition, with this configuration, it is understood that the specification (start temperature or the inclination of control characteristic) of derating control is set based on the resistance values of the resistors R31 and R32 and the characteristics of the transistors 33 and 34 together with the temperature characteristics of the thermistor Rth.

In the vehicle lamp 1 of the present embodiment, the signal generation unit 32 is mounted on the light source device 3 side as described above.

In addition, the coding resistor Rc is a drive current adjustment resistor provided corresponding to a light emitting element. The steady-state value of the drive current Idr is changed depending on the type of light source, the number of light-emitting elements, or the light flux rank. Thus, the coding resistor Rc is disposed as an adjustment element so as to obtain an appropriate drive current value depending on the light source configuration in the light source device 3.

In addition, since the coding resistor Rc corresponds on a light emitting element configuration, the coding resistor Rc is usually mounted on the light source device 3 side.

When the coding resistor Rc serves as a voltage dividing resistor for setting the voltage value of the derating control signal Std at the normal temperature, a steady-state drive current value may be set based on the resistance value of the coding resistor Rc.

Figure 3:
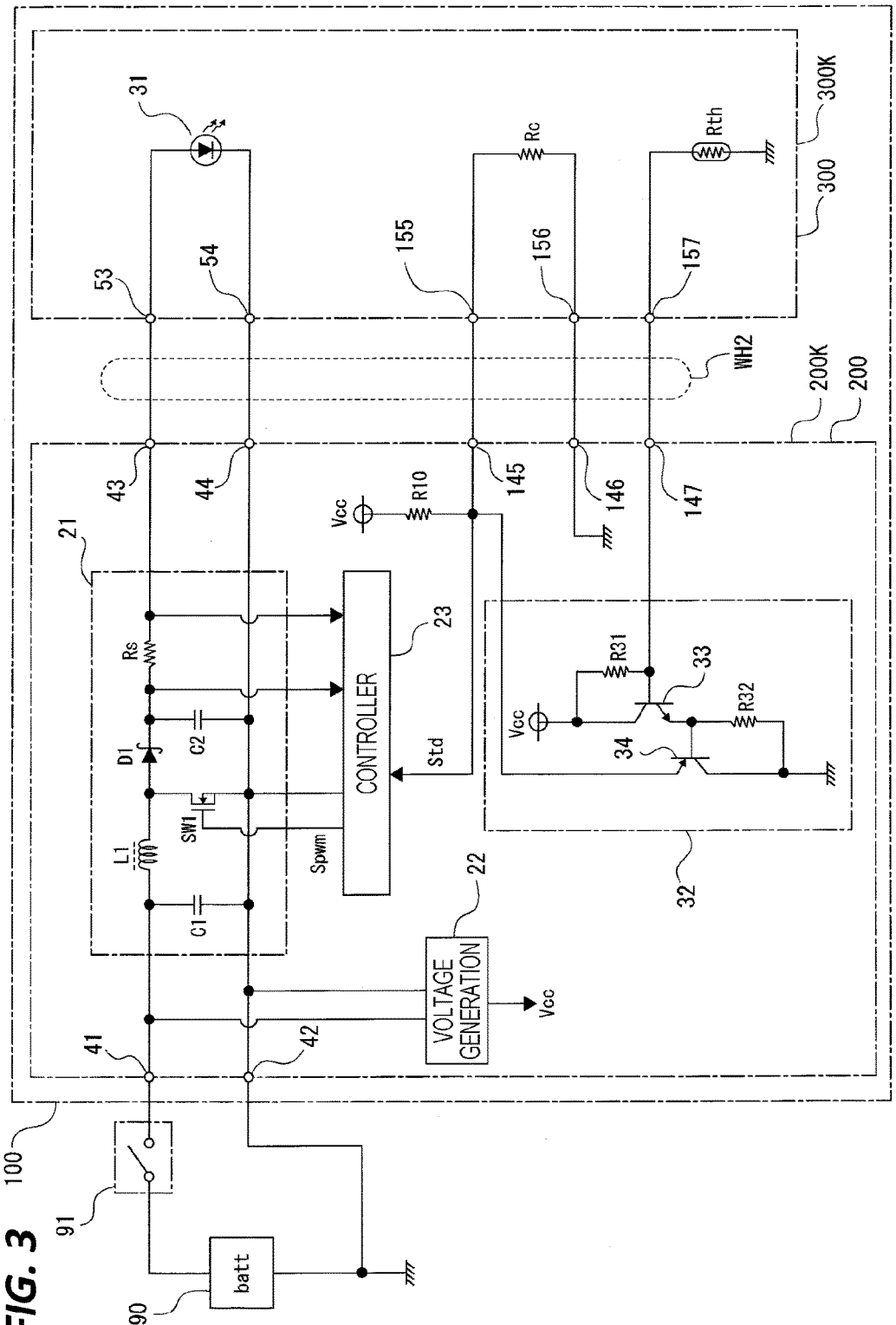
FIG. 3 is a circuit diagram of a vehicle lamp as a comparative example.

Here, FIG. 3 illustrates a vehicle lamp 100 as a comparative example. The circuit configuration in FIG. 3 is substantially the same as that of FIG. 1. The same reference numerals will be given to the same parts as those in FIG. 1, and a description of the respective same parts will be omitted.

The vehicle lamp 100 of the comparative example is configured with a current supply device 200 and a light source device 300, but the signal generation unit 32 is disposed on a current supply device 200 (a current supply substrate 200 K) side, unlike the vehicle lamp 1 of the exemplary embodiment of FIG. 1.

The thermistor Rth and the coding resistor Rc are mounted in the light source device 300 (a light source substrate 300K).

The coding resistor Rc is connected between terminals 155 and 156.

The thermistor Rth is connected between a terminal 157 and a ground (the terminal 156).

The line of a terminal 145 and the terminal 155 is used as a line for inserting the control resistor R10 and the coding resistor Rc between the reference voltage Vcc and the ground.

The line of a terminal 146 and the terminal 156 is a ground line.

The line of a terminal 147 and the terminal 157 is a line for connecting the thermistor Rth to the base of the transistor 33.

The terminals 43, 44, 145, 146, and 147 and the terminals 53, 54, 155, 156, and 157 are connected to each other by a second harness WH2.

The vehicle lamp 100 of FIG. 3 also has the same circuit configuration as the vehicle lamp 1 of FIG. 1, and is subjected to temperature derating control in the same manner as described above.

Figure 4A:
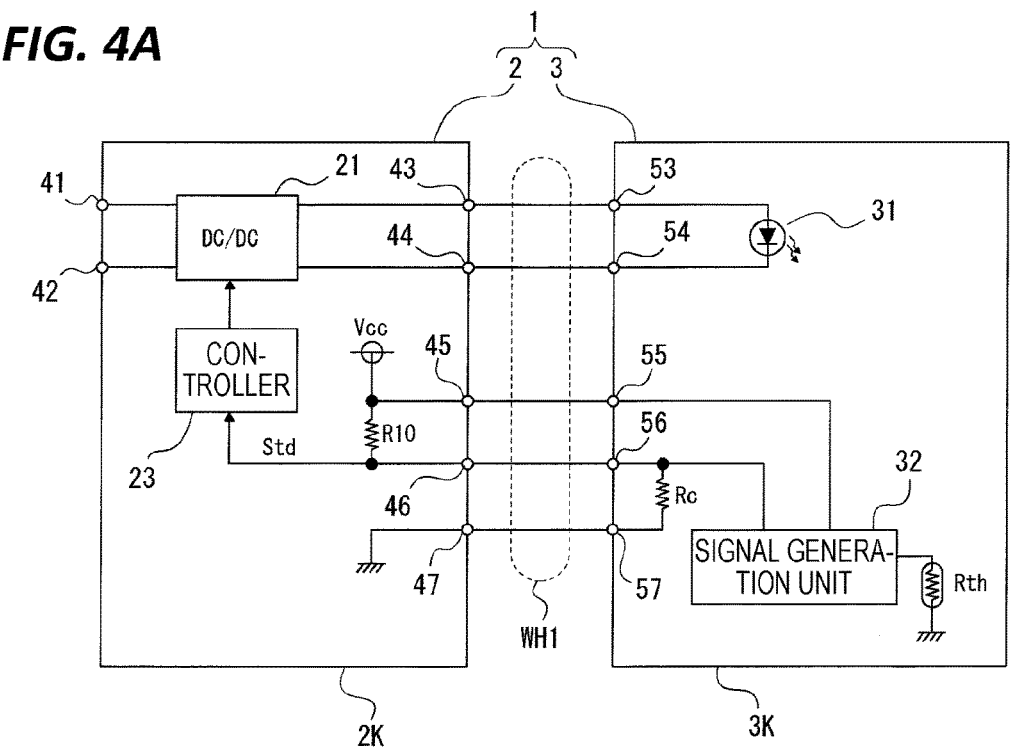
FIGS. 4A and 4B are block diagrams of the vehicle lamps according to the first exemplary embodiment and the comparative example.
Figure 4B:
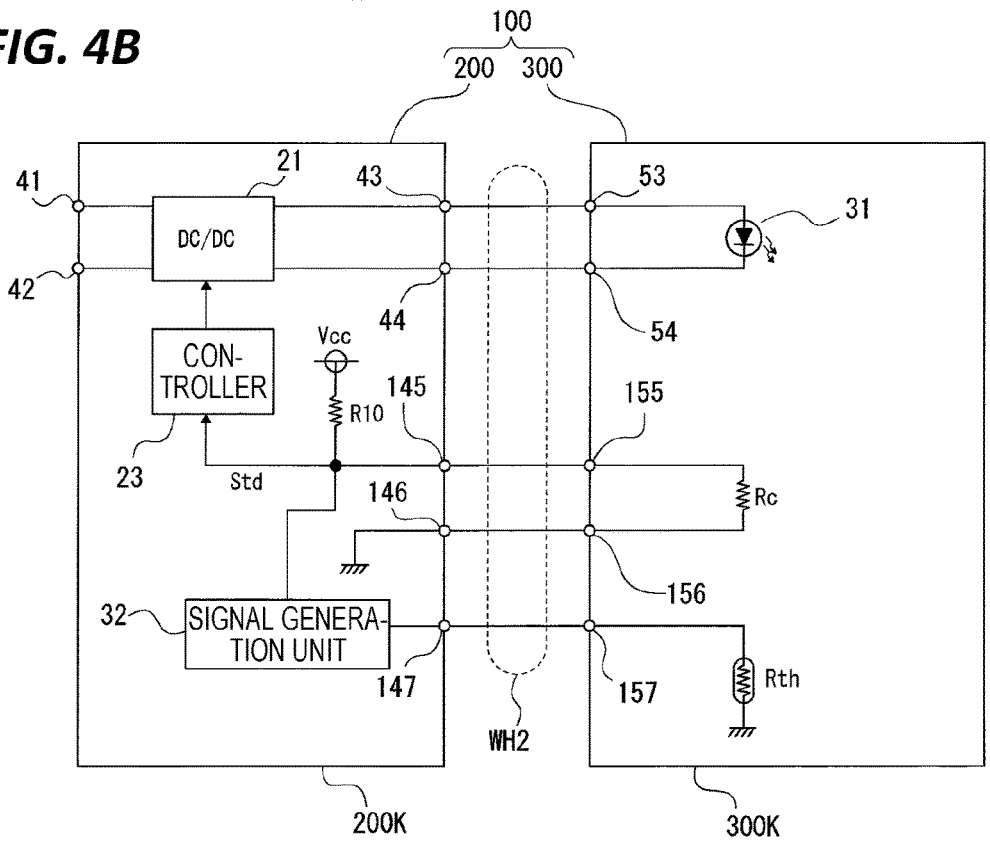

FIGS. 4A and 4B are block diagrams illustrating in comparison the vehicle lamp 1 of the exemplary embodiment of FIG. 1 and the vehicle lamp 100 of the comparative example of FIG. 3, respectively.

The signal generation unit 32 is a circuit for setting temperature derating characteristics as described above. Then, different temperature derating specifications are obtained depending on the characteristics or configuration of the light emitting element on the light source device side. Therefore, the current supply device 200 of FIG. 4B, which is a comparative example, it is not limited as being applicable to various light source devices 300, and thus is difficult to become a standardized current supply device.

On the other hand, since the current supply device 2 of the exemplary embodiment of FIG. 4A does not include the signal generation unit 32, the current supply device is applicable to various light source devices 3. In other words, when the light source device 3 includes the signal generation unit 32 depending on an own light source configuration thereof, the light source device 3 may be driven to emit light by the standardized current supply device 2 and may also exert an appropriate temperature derating function. In addition, by executing an appropriate temperature derating function, the light source device 3 does not need to mount, for example, an excessive heat sink mechanism.

In addition, as can be appreciated by comparing FIGS. 4A and 4B with each other, the number of connection lines by the first harness WH1 between the current supply device 2 and the light source device 3 does not differ from the number of connection lines by the second harness WH2 between the current supply device 200 and the light source device 300.

That is, by utilizing a wiring configuration in the case of using the coding resistor Rc, the vehicle lamp 1 of the present exemplary embodiment may dispose the signal generation unit 32 on the light source substrate 3K side without increasing the number of inter-substrate wirings. Thus, a cost increase or configuration complication due to a wiring increase does not occur.

In addition, an operating example of the signal generation unit 32 in the case where the detected temperature is 25° C. has been illustrated. However, in the vehicle lamp device 100 of the comparative example, the current between the terminals 147 and 157 in the second harness WH2 is 49 μA since the current corresponds to the current flowing in the thermistor Rth.

On the other hand, in the vehicle lamp 1 of the exemplary embodiment, the current between the terminals 46 and 56 in the first harness WH1 is 129 μA.

That is, the vehicle lamp 1 of the exemplary embodiment also has an advantage in that the vehicle lamp 1 is more resistant to electromagnetic noise than the comparative example since the current flowing to the first harness WH1 increases at a low temperature.

Figure 5:
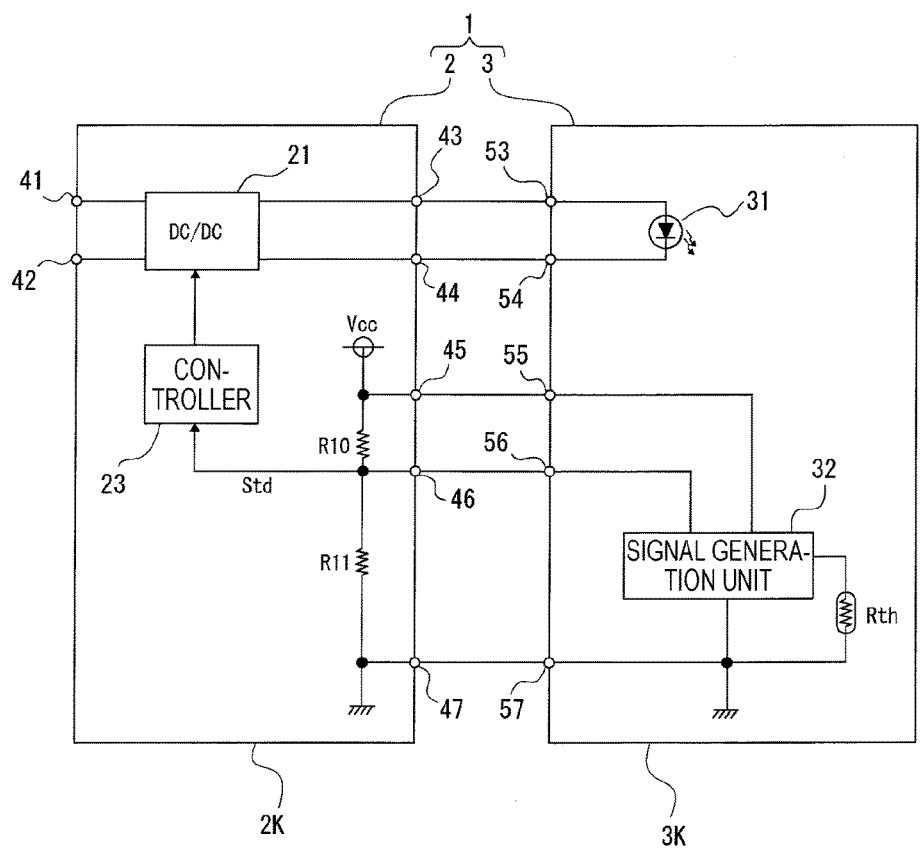
FIG. 5 is a block diagram of a modification of the first exemplary embodiment.

Subsequently, FIG. 5 illustrates a modification of the first exemplary embodiment.

The modification is an example in which the coding resistor Rc is not used. The same reference numerals will be given to the same parts as those in FIG. 1 (FIG. 4A), and a repeated description thereof will be omitted.

In this case, a resistor R11 is disposed, in addition to the control resistor R10, on the current supply device 2 side, and a voltage value as the derating control signal Std at a normal temperature is generated via voltage division between the reference voltage Vcc and the ground using the control resistor R10 and the resistor R11.

With this configuration, when the coding resistor Rc is not used, it is possible to exert an appropriate temperature derating function using the derating control signal Std from the signal generation unit 32 on the light source device 3 side, in the same manner as the vehicle lamp 1 of FIG. 1.

<Second Embodiment>

Figure 6:
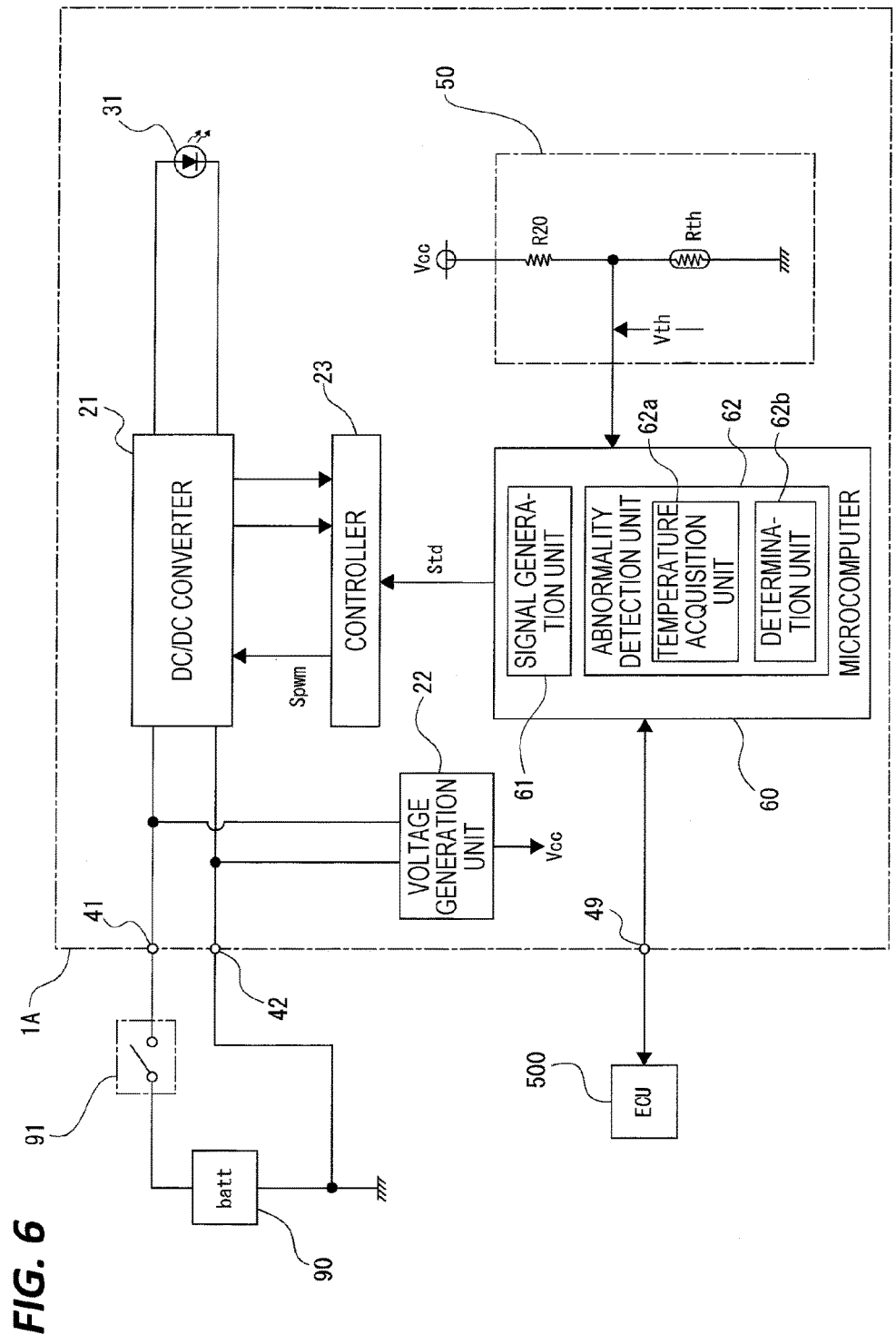
FIG. 6 is a block diagram of a vehicle lamp according to a second exemplary embodiment.

FIG. 6 illustrates a configuration of a vehicle lamp 1A according to a second exemplary embodiment. In addition, the same reference numerals will be given to the same parts as those in FIG. 1, and a repeated description thereof will be omitted.

The vehicle lamp 1A of FIG. 6 is an example in which temperature derating control is performed using a microcomputer 60.

In addition, in FIG. 6, a current supply device and a light source device are not clearly divided, unlike the current supply device 2 and the light source device 3 of the first exemplary embodiment.

In the second exemplary embodiment, the current supply device and the light source device may be integrally formed using, for example, a common substrate, or may be formed on separate substrates, in the same manner as the first exemplary embodiment.

In the case where separate substrates are provided, for example, it is conceivable that the LED 31, which is a light emitting element, and a temperature detection circuit 50 are disposed on the light source device side. In that case, a substrate, on which the LED 31, the temperature detection circuit 50, and the microcomputer 60 (or at least the function of a signal generation unit 61) are mounted, corresponds to the light source device 3 of the first exemplary embodiment.

In the second exemplary embodiment, abnormality detection of the thermistor Rth in the temperature detection circuit 50 may be appropriately performed.

A resistor R20 and the thermistor Rth are provided as the temperature detection circuit 50.

That is, the resistor R20 and the thermistor Rth are connected in series between the reference voltage Vcc and the ground. The voltage divided by the resistor R20 and the thermistor Rth is input, as a detected temperature value (detected voltage Vth), to the microcomputer 60.

In this example, the microcomputer 60 has a functional configuration as the signal generation unit 61 and an abnormality detection unit 62 by a software program.

The signal generation unit 61 functions to execute the operation of the signal generation unit 32 in the first exemplary embodiment by calculation. That is, the signal generation unit 61 performs calculation to generate the derating control signal Std based on the detected voltage Vth. The controller 23 controls the drive current Idr based on the derating control signal Std.

The abnormality detection unit 62 functions to perform calculation for detecting abnormality of the thermistor Rth. The abnormality detection unit 62 has a processing function as a temperature acquisition unit 62a and a processing function as a determination unit 62b.

The temperature acquisition unit 62a performs a first processing of acquiring temperature detection information when the lighting of the LED 31, which is a light emitting element, starts, and a second processing of acquiring temperature detection information at a time point after a predetermined time has passed from the start of lighting.

The determination unit 62b determines a change in the temperature detection information acquired in the first processing and the detection information acquired in the second processing, and performs abnormality determination of the thermistor Rth, which is a temperature sensor.

In addition, the microcomputer 60 may communicate with an ECU 500 on the vehicle side via a terminal 49. Thus, for example, the microcomputer may notify the vehicle side of the occurrence of abnormality when abnormality is detected.

The abnormality of the thermistor Rth will be described.

The temperature detection circuit 50 uses the thermistor Rth as a temperature sensor as illustrated, and the voltage divided by the resistor R20 and the thermistor Rth is a detected temperature value (detected voltage Vth).

In addition, by using an NTC thermistor as the thermistor Rth, the detected voltage Vth is as follows.

At low temperature, the detected voltage Vth corresponds to the reference voltage Vcc.

At high temperature, the detected voltage Vth corresponds to the ground potential.

When the temperature detection circuit 50 fails, it may be impossible for the controller 23 to control a reduction in the drive current Idr, and thus there is a risk of the LED 31 being destroyed.

Meanwhile, even when the temperature detection circuit 50 or a part thereof fails, it is difficult to determine a failure due to a change in objects or characteristics.

This is because the detected voltage Vth becomes the potential of the reference voltage Vcc when the thermistor Rth suffers from an open failure and the detected voltage Vth becomes the ground potential when the thermistor Rth suffers from a short-circuit failure, and as a result, the open failure is not distinguished from low temperature detection, or the short-circuit failure is not distinguished from high temperature detection.

Thus, in the present exemplary embodiment, failure determination is performed using a change in temperature due to self-heating during the lighting of the LED 31.

Figure 7:
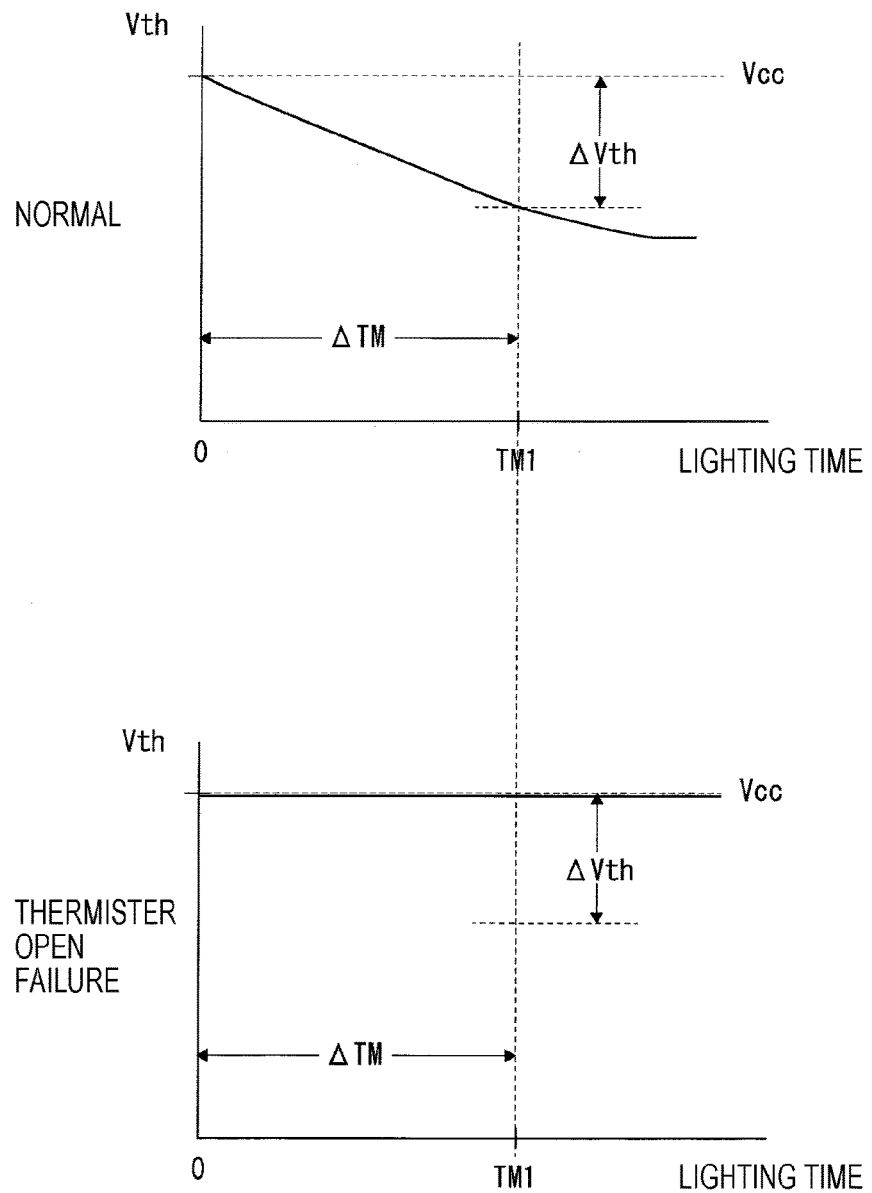
FIG. 7 is an explanatory diagram of an abnormality detection operation of the second exemplary embodiment.

FIG. 7 illustrates a change in the detected voltage Vth between normality and abnormality. The vertical axis represents the value of the detected voltage Vth. The lighting time on the horizontal axis is the time that has passed from the start of lighting of the LED 31.

Since the temperature detected by the thermistor Rth rises due to self-heating of the LED 31 in the normal state, the detected voltage Vth decreases. At a time point TM1 after a certain time ΔTM has passed, a change in voltage equal to or greater than the voltage difference ΔVth occurs as the detected voltage Vth. The time ΔTM may be, for example, about 15 minutes, but is not limited thereto.

On the other hand, when open abnormality occurs in the thermistor Rth, the detected voltage Vth still remains at the potential of the reference voltage Vcc even after the time ΔTM has passed from the start of lighting. That is, a change in temperature is not detected due to self-heating of the LED 31 and the DC/DC converter 21.

Using such events, abnormality determination is performed. That is, in short, abnormality determination is performed in the following sequence of (1) to (3).

(1) In a first processing, the LED 31 is turned on, and the detected voltage Vth at that time is acquired.

(2) In a second processing, the detection voltage Vth is acquired when the time ΔTM has passed after the start of lighting.

(3) In a determination processing, the occurrence of abnormality is determined based on the difference between the detected voltages Vth acquired in the first processing and the second processing.

Figure 8:
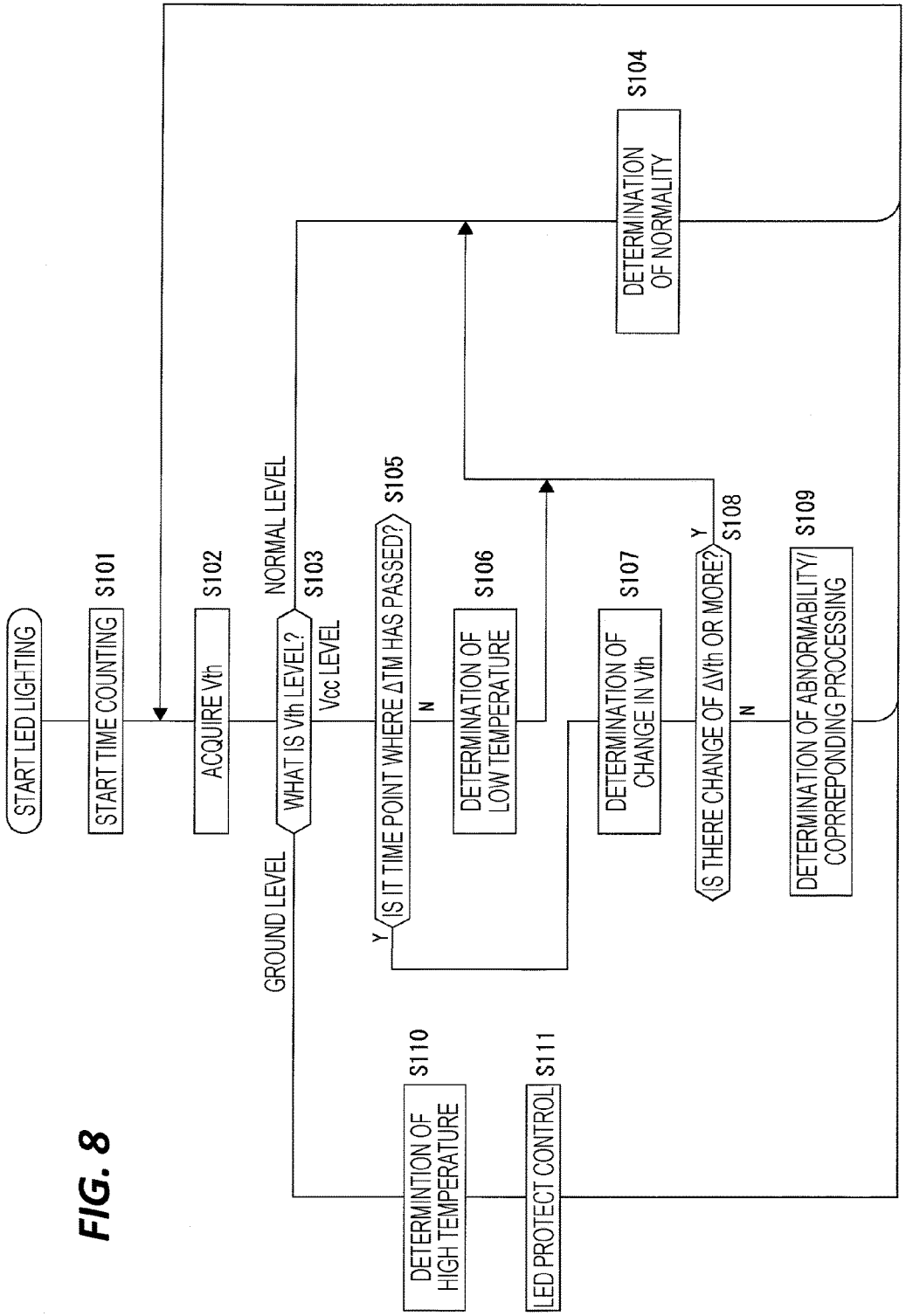
FIG. 8 is a flowchart of a processing for abnormality detection of the second exemplary embodiment.

A specific processing example by the microcomputer 60 (the abnormality detection unit 62) is illustrated in FIG. 8.

FIG. 8 illustrates an abnormality detection processing performed when the controller 23 starts the output of the drive current Idr by the DC/DC converter 21 and starts the lighting of the LED 31.

When lighting of the LED 31 starts, the microcomputer 60 starts time counting in step S101. This is to count the time that has passed from the start of lighting.

In step S102, the microcomputer 60 acquires and stores the detected voltage Vth at a time point at which lighting starts.

In step S103, the microcomputer 60 branches the processing based on the level of the detected voltage Vth. That is, the microcomputer determines whether the level of the detected voltage is the level of the reference voltage Vcc, the ground level, or any other normal level.

When it is determined that the level of the detected voltage is the normal level, the microcomputer 60 proceeds to step S104 and determines that the temperature sensor is normal. Then, the microcomputer 60 returns to step S102 and continues the abnormality determination processing.

When the ground level is determined in step S103, the microcomputer 60 performs determination of a high temperature in step S110, and performs LED protection control in step S111. Specifically, it is conceivable to perform stop the control of the DC/DC converter 21. That is, a drive stop instruction of the DC/DC converter 21 is output to the controller 23.

When the DC/DC converter 21 is stopped by the LED protection control, it is conceivable to subsequently restart the driving of the DC/DC converter 21 when the detected temperature returns to the normal level.

In this example, the ground level is a voltage detected at a temperature at which the light emission of the LED 31 needs to be stopped, and it is determined that it has already reached a temperature situation in which the reduction of the drive current Idr by temperature derating is insufficient. In addition, although there is a possibility of the thermistor Rth having a short-circuit failure at the ground level, the driving of the DC/DC converter 21 may be stopped in consideration of that case. When there is no short-circuit failure, thereafter, lighting is restarted as the detected voltage Vth becomes the normal level.

When it is determined in step S103 that the detected voltage Vth is the level of the reference voltage Vcc, the microcomputer 60 proceeds to step S105 to determine whether or not the current time is a time point at which the time ΔTM has passed after the start of lighting.

When the current time is not the time point, the microcomputer 60 determines a low temperature state based on the detected voltage Vth, and proceeds to step S104 so as to continue the processing. That is, the occurrence of abnormality is not particularly determined.

On the other hand, when the time ΔTM has passed from the start of lighting at the time point at which the microcomputer 60 proceeds to step S105, the microcomputer 60 proceeds to step S107 and performs determination of a change in the detected voltage Vth.

Here, the microcomputer 60 calculates a difference VthS−VthC between the detected voltage Vth (referred to as VthS) at the start of lighting and the detected voltage Vth (referred to as VthC) acquired at this time, and determines whether the difference VthS−VthC is equal to or greater than a predetermined difference value ΔVth.

When (VthS−VthC)≥ΔVth, this means that the thermistor Rth detects a change in temperature due to self-heating of the LED 31. In that case, the microcomputer 60 proceeds from step S108 to step S104 to determine normality.

On the other hand, when (VthS−VthC)<ΔVth, this means that the thermistor Rth detects no change in temperature due to self-heating of the LED 31. In that case, an open failure of the thermistor Rth may be determined. Then, the microcomputer 60 proceeds from step S108 to step S109 and determines abnormality and performs a corresponding processing. For example, the microcomputer performs a corresponding processing of notifying the ECU 500 of a failure detection signal.

In addition, in the processing example described above, abnormality is determined based on the difference between the detected voltage Vth at the start of lighting and the detected voltage Vth at the time point at which the time ΔTM has passed, a condition of abnormality determination may be that the difference between the detected voltage Vth at the time point at which lighting starts and the detected voltage Vth at the time point at which the time ΔVth has passed continuously does not reach ΔVth.

<Effects and Modifications of Embodiments>

According to the current supply device mounted in the vehicle lamp 1 or 1A described above as the first and second embodiments, the following effects may be obtained.

The light source device 3 in the vehicle lamp 1 of the first embodiment includes the LED 31 (light emitting element), which emits light when receiving the drive current Idr from the current supply device 2, the thermistor Rth (temperature sensor), which perform temperature detection at a position closer to the LED 31 than the current supply device 2, and the signal generation unit 32, which is disposed on the light source substrate 3K on which the thermistor Rth is disposed, and outputs the derating control signal Std as a control signal of the drive current Idr to the current supply device 2 based on a detected value of the thermistor Rth.

In this case, the thermistor Rth as a temperature sensor and the signal generation unit 32 are disposed on the light source substrate 3K on which the light emitting element such as the LED 31 is disposed.

For example, in temperature derating to thermally protect the LED 31 by reducing the drive current Idr for the LED 31 at a high temperature, it is necessary to appropriately set the temperature (start temperature) at which the drive current Idr starts to decrease or the inclination thereof. Thus, the signal generation unit 32 sets the start temperature or the inclination thereof by a circuit constant, and then generates the derating control signal Std depending on the detected temperature.

The start temperature or the inclination thereof required for setting the temperature derating is changed depending on the light source specification. For example, the temperature derating setting specification is changed depending on, for example, the number of light emitting elements, the range of a drive current value, the heat dissipation structure, or the ambient temperature environment.

Since the light source device 3 of the exemplary embodiment includes the LED 31, the thermistor Rth, and the signal generation unit 32, the circuit constant of the signal generation unit 32 may be designed depending on the light source specification.

Therefore, design change depending on the light source specification is unnecessary on the current supply device 2 side, and the sharing and standardization of the current supply device 2 is realized.

In addition, on the contrary, according to the temperature derating setting in a case where the signal generation unit 32 is disposed in the current supply device 2, it is not necessary to increase, for example, the size of the heat dissipation structure on the light source device 3 side.

By these, a reduction in the cost of both the light source device 3 and the current supply device 2 may be realized, and versatility thereof may be expanded.

Moreover, according to a configuration in which the LED 31, the thermistor Rth, and the signal generation unit 32 are provided on the light source device 3 side, it is possible to reduce the number of design processes and adjustment processes of a derating circuit for each type of vehicle lamp.

In the first exemplary embodiment, when the temperature detected by the thermistor Rth is equal to or higher than a predetermined temperature, the signal generation unit 32 generates the derating control signal Std to reduce the drive current Idr depending on the temperature.

The signal generation unit 32 is a circuit that sets the start temperature as the temperature derating and the inclination of the derating characteristic, but is configured to lower the drive current Idr from the current supply device 2 from a basic current value at a high temperature. Thereby, temperature derating is realized to thermally protect the LED 31 under a high temperature equal to or higher than a predetermined temperature.

In the first exemplary embodiment, the signal generation unit 32 includes a control signal line, which outputs the derating control signal Std to the current supply device 2. In addition, the coding resistor Rc is connected as an adjustment element to adjust the value of the derating control signal Std.

A control signal value may be adjusted by connecting, for example, a resistor as an adjustment element between the control signal line and the ground line. For example, when the current value of the LED 31 is different or adjustment is required depending on the luminous flux rank of the LED 31, the coding resistor Rc is used.

In this case, in the conventional vehicle lamp 100, as illustrated in FIG. 4B, a power supply line and a ground line, which are connected to the opposite ends of the coding resistor Rc, are required between the light source substrate 300K and the light source drive substrate 200 K, and in addition, a line for obtaining a detected temperature value from the thermistor Rth is required.

In the exemplary embodiment, the signal generation unit 32 is provided on the light source device 3 side, but the number of harness connecting lines does not increase since the coding resistor Rc as an adjustment element may be connected between the control signal line and the ground line. That is, even if the signal generation unit 32 is provided on the light source device 3 side, an increase in the number of harness connection lines may be prevented by devising the connection of the coding resistor Rc.

In the first exemplary embodiment, the current supply device 2 includes the control resistor R10 having one end connected to the reference voltage Vcc, and is configured to output the control signal Std to the other end of the control resistor R10. In addition, the signal generation unit 32 is configured to sink the control current to the other end of the control resistor R10 via the control signal line when the temperature is equal to or higher than a predetermined value, and to increase the amount of control current as the temperature increases. That is, the control signal Std based on the reference voltage Vcc may be obtained on the other end side of the control resistor R10, and the control signal Std is changed as the amount of current increases on the other end side.

As a result, when the control signal Std is generated with a simple configuration, particularly when the temperature is equal to or higher than a predetermined value, the voltage value of the control signal Std is changed depending on the temperature. That is, since the divided voltages of the control resistor R10 and the coding resistor Rc become the control signal Std at a low temperature, it is possible to generate the control signal Std of a stable voltage at a low temperature, and it is also possible to generate the control signal Std, the voltage of which is lowered depending on, for example, the emitter-collector current of the transistor 34 at a high temperature.

In the second exemplary embodiment, the abnormality detection unit 62, which includes the temperature acquisition unit 62a, which performs the first processing of acquiring the detection information of the temperature sensor at the start of lighting of the LED 31, which is a light emitting element, and the second processing of acquiring the detection information of the temperature sensor at the time point at which a predetermined time has passed from the start of lighting, and the determination unit 62b, which determines a change in the detection information acquired in the first processing and the detection information acquired in the second processing to determine abnormality of the temperature sensor, has been described.

In addition, according to this processing, it is possible to discriminate the open failure of the thermistor Rth from a low temperature state, and in a case of an open failure, it is possible to appropriately perform a countermeasure (e.g., a reduction in drive current).

In addition, in the exemplary embodiment, the light source device 3 in the vehicle lamp 1 is described by way of example, but may be applied as a light source device of various lamps.

For example, the light source device of the present disclosure may be used in, for example, a lamp for road lighting, a lamp for outdoor lighting, or a lamp for indoor lighting, and may also realize an increase in reliability by appropriate temperature derating in these lamps.

In addition, the abnormality detection device of the present disclosure may also be applied to various lamps such as a lamp for road lighting, a lamp for outdoor lighting, or a lamp for indoor lighting.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A light source drive device comprising:
a current supply device; and
a light source device including a light emitting element that emits light by receiving drive current supplied from the current supply device, a temperature sensor that performs temperature detection at a position closer to the light emitting element than the current supply device, and a signal generation circuit that outputs a control signal for controlling the drive current depending on a detected value of the temperature sensor to the current supply device,
wherein the signal generation circuit generates a control signal for reducing the drive current depending on a temperature when the temperature detected by the temperature sensor is equal to or higher than a predetermined temperature, and
each of the current supply device and the light source device is configured on different substrates, respectively, and connected to each other by a harness.

2. The light source drive device of claim 1, wherein the signal generation circuit includes a control signal line that outputs the control signal to the current supply device, and is connected to an adjustment element that adjusts a value of the control signal.

3. The light source drive device of claim 2, wherein the current supply device includes a control resistor having one end connected to a reference voltage and is configured to output the control signal to a remaining end of the control resistor, and
the signal generation circuit sinks control current to the remaining end of the control resistor via the control signal line when the temperature is equal to or higher than the predetermined temperature, and increases an amount of the control current as the temperature increases.

4. A vehicle lamp comprising:
the light source drive device of claim 3; and
a voltage conversion circuit that performs voltage conversion by receiving a DC voltage, and supplies a drive current to cause the light emitting element to emit light.

5. The light source drive device of claim 3, wherein the light source device includes a coding resistor in series with the control resistor, and
the control current is a voltage value obtained by voltage-dividing a line of the reference voltage by the control resistor and the coding resistor.

6. A vehicle lamp comprising:
the light source drive device of claim 2; and
a voltage conversion circuit that performs voltage conversion by receiving a DC voltage, and supplies a drive current to cause the light emitting element to emit light.

7. The light source drive device of claim 1, wherein the current supply device includes a control resistor having one end connected to a reference voltage and is configured to output the control signal to a remaining end of the control resistor, and
the signal generation circuit sinks control current to the remaining end of the control resistor via the control signal line when the temperature is equal to or higher than the predetermined temperature, and increases an amount of the control current as the temperature increases.

8. A vehicle lamp comprising:
the light source drive device of claim 7; and
a voltage conversion circuit that performs voltage conversion by receiving a DC voltage, and supplies a drive current to cause the light emitting element to emit light.

9. The light source drive device of claim 7, wherein the light source device includes a coding resistor in series with the control resistor, and
the control current is a voltage value obtained by voltage-dividing a line of the reference voltage by the control resistor and the coding resistor.

10. A vehicle lamp comprising:
the light source drive device of claim 1; and
a voltage conversion circuit that performs voltage conversion by receiving a DC voltage, and supplies a drive current to cause the light emitting element to emit light.

11. A light source drive device comprising:
a temperature acquisition unit including a light emitting element and a temperature sensor that detects a temperature near the light emitting element, the temperature acquisition unit performing a first processing of acquiring detection information of the temperature sensor when lighting of the light emitting element starts and a second processing of acquiring detection information of the temperature sensor at a time point at which a predetermined time has passed from the start of lighting; and a controller configured to calculate a difference between the detection information acquired in the first processing and the detection information acquired in the second processing and determine whether the temperature sensor is in an abnormal state by comparing the difference to a predetermined value.

12. A vehicle lamp comprising:

the light source drive device of claim 11; and a voltage conversion circuit that performs voltage conversion by receiving a DC voltage, and supplies a drive current to cause the light emitting element to emit light.

13. The light source drive device of claim 11, wherein the controller is configured to determine whether a level of the detection information acquired in the first processing is a reference voltage level or a ground level, and stop driving of a current supply device that supplies drive current to the light emitting device when it is determined that the level of the detection information acquired in the first processing is the ground level.

\* \* \* \* \*